(12) United States Patent
Kebler et al.

(10) Patent No.: US 9,998,361 B2
(45) Date of Patent: Jun. 12, 2018

(54) MLDP MULTICAST ONLY FAST RE-ROUTE OVER REMOTE LOOP-FREE ALTERNATE BACKUP PATH

(71) Applicant: Juniper Networks, Inc., Sunnyvale, CA (US)

(72) Inventors: Robert W. Kebler, Newburyport, MA (US); Vikram Nagarajan, Chennai (IN); Bharath RadhaKrishna Bhat, Bangalore (IN); Anish Peter, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 21 days.

(21) Appl. No.: 14/980,945

(22) Filed: Dec. 28, 2015

(65) Prior Publication Data
US 2017/0093695 A1 Mar. 30, 2017

(30) Foreign Application Priority Data
Sep. 30, 2015 (IN) .......................... 5226/CHE/2015

(51) Int. Cl.
*G01R 31/08* (2006.01)
*H04L 12/703* (2013.01)
(Continued)

(52) U.S. Cl.
CPC .............. *H04L 45/28* (2013.01); *H04L 45/18* (2013.01); *H04L 45/507* (2013.01); *H04L 47/806* (2013.01); *H04L 67/1046* (2013.01)

(58) Field of Classification Search
CPC .............................. H04L 45/507; H04L 45/02
(Continued)

(56) References Cited

U.S. PATENT DOCUMENTS

| 9,401,859 B2 | 7/2016 | Kotalwar |
| 2009/0201803 A1 | 8/2009 | Filsfils |

(Continued)

OTHER PUBLICATIONS

Kebler et al., "PIM Extensions for Protection Using Maximally Redundant Trees," Protocol Independent Multicast Working Group, Jul. 12, 2013, 12 pp.

(Continued)

*Primary Examiner* — Iqbal Zaidi
(74) *Attorney, Agent, or Firm* — Shumaker & Sieffert, P.A.

(57) ABSTRACT

Techniques are described for enhancements to multicast Label Distribution Protocol (mLDP) to support multicast only fast re-route (MoFRR) over a remote loop free alternate (RLFA) backup path. An egress router is configured to generate a modified mLDP control message to signal the RLFA backup path in which an address of a RLFA node is included in an LSPRoot field and an address of an ingress router is included in an opaque data field. In addition, the RLFA node of the RLFA backup path is configured to recognize that it is identified in the LSPRoot field of the modified mLDP control message, and, in response, look up the ingress router identified in the opaque data field of the modified mLDP control message. The RLFA node is further configured to send an mLDP control message that includes the address of the ingress router in the LSPRoot field towards the ingress router.

21 Claims, 9 Drawing Sheets

(51) Int. Cl.
  *H04L 12/927* (2013.01)
  *H04L 12/723* (2013.01)
  *H04L 12/705* (2013.01)
  *H04L 29/08* (2006.01)

(58) Field of Classification Search
  USPC .................................................. 370/228–389
  See application file for complete search history.

(56) References Cited

U.S. PATENT DOCUMENTS

| | | | |
|---|---|---|---|
| 2013/0336192 A1 | 12/2013 | Zhao | |
| 2014/0198634 A1* | 7/2014 | Kumar | H04L 45/00 370/228 |
| 2015/0036685 A1* | 2/2015 | Wijnands | H04L 45/507 370/390 |
| 2015/0103671 A1* | 4/2015 | Ernstrom | H04L 41/0659 370/238 |
| 2015/0172070 A1 | 6/2015 | Csaszar | |

OTHER PUBLICATIONS

Atlas et al., "An Architecture for IP/LDP Fast-Reroute Using Maximally Redundant Trees," Routing Area Working Group, Jul. 4, 2011, 21 pp.

Wijnands et al., "Using Multipoint LDP When the Backbone Has No Route to the Root," Internet Engineering Task Force (IETF), Feb. 2012, 12 pp.

Extended Search Report from counterpart European Application No. 16190875.1, dated Feb. 27, 2017, 12 pp.

Adams et al., "Protocol Independent Multicast—Dense Mode (PIM-DM): Protocol Specification (Revised)," RFC 3973, Network Working Group, The Internet Society, Jan. 2005, 61 pp.

Fenner et al., "Protocol Independent Multicast—Sparse Mode (PIM-SM): Protocol Specification (Revised)," RFC 4601, Network Working Group, The Internet Society, Aug. 2006, 112 pp.

Holbrook et al., "Source-Specific Multicast for IP," RFC 4607, Network Working Group, The Internet Society, Aug. 2006, 19 pp.

Handley et al., "Bidirectional Protocol Independent Multicast (BIDIR-PIM)," RFC 5015, Network Working Group, The Internet Society, Oct. 2007, 43 pp.

Atlas et al., "Basic Specification for IP Fast Reroute: Loop-Free Alternates," RFC 5286, Network Working Group, The IETF Trust, Sep. 2008, 31 pp.

Bryant et al., "Remote Loop-Free Alternate (LFA) Fast Reroute (FRR)," RFC 7490, Internet Engineering Task Force (IETF), The IETF Trust, Apr. 2015, 29 pp.

Karan et al., "Multicast only Fast Re-Route," Network Working Group, Internet Draft, draft-ietf-rtgwg-mofrr-08, May 18, 2015, 14 pp.

Wijnands, et al., "Using Multipoint LDP When the Backbone Has No Route to the Root," RFC 6512, Internet Engineering Task Force (IETF), The IETF Trust, Feb. 2012, 12 pp.

Wijnands et al., "Multipoint LDP in-band signaling for Point-to-Multipoint and Multipoint-to-Multipoint Label Switched Paths," Network Working Group, Internet Draft, draft-ietf-mpls-mldp-in-band-signaling-08, Nov. 29, 2012, 13 pp.

Karan et al., "Multicast only Fast Re-Route," Network Working Group, Internet Draft, draft-ietf-rtgwg-mofrr-04, May 14, 2014, 14 pp.

Wijnands et al., "Label Distribution Protocol Extensions for Point-to-Multipoint and Multipoint-to-Multipoint Label Switched Paths," RFC 6388, Internet Engineering Task Force (IETF), Nov. 2011, 39 pp.

U.S. Appl. No. 14/870,941, by Nischal Singh et al., filed Sep. 30, 2015.

Karan, et al., "Multicast only Fast Re-Route." Network Working Group Internet Draft, draft-karan-mofrr-02, IETF Trust, Jun. 19, 2013, 14 pp.

Notice of Allowance dated Sep. 22, 2017 in U.S. Appl. No. 14/870,941, 18 pps.

Response to Extended European Search Report dated Feb. 27, 2017, from counterpart European Application No. 16190875.1, filed Oct. 5, 2017, 21 pp.

Examination Report from counterpart European Application No. 16190875.1, dated Mar. 19, 2018, 11 pp.

* cited by examiner

MLDP MULTICAST ONLY FAST RE-ROUTE OVER REMOTE LOOP-FREE ALTERNATE BACKUP PATH

This application claims the benefit of India Patent Application 5226/CHE/2015, filed Sep. 30, 2015, the entire contents of which are hereby incorporated by reference.

TECHNICAL FIELD

The disclosure relates to computer networks and, more particularly, to distribution of multicast traffic over computer networks.

BACKGROUND

A computer network is a collection of interconnected computing devices that exchange data and share resources. In a packet-based network the computing devices communicate data by dividing the data into small blocks called packets. Certain devices within the network, such as routers and switches, maintain routing and/or forwarding information that describe paths through the network. In this way, the packets may be individually transmitted across the network from a source device to a destination device. The destination device extracts the data from the packets and assembles the data into its original form. Dividing the data into packets enables the source device to resend only those individual packets that may be lost during transmission.

Examples of computer networks include enterprise networks, branch networks, service provider networks, home networks, virtual private networks (VPNs), local area network (LANs), virtual LANs (VLANs) and the like. In any case, the computer networks may enable remotely located sources and receivers to share data. In some cases, the computer network may be configured to support multicast traffic, such as Internet Protocol Television (IPTV), desktop conferences, corporate broadcasts, music and video web casts, and other forms of multimedia content. For example, the computer network may utilize multicast Label Distribution Protocol (mLDP) as a multicast routing protocol to build distribution trees through the computer network for the transmission of multicast traffic from sources to receivers or subscriber devices for particular multicast groups.

SUMMARY

In general, this disclosure describes enhancements to multicast Label Distribution Protocol (mLDP) to support multicast only fast re-route (MoFRR) over a remote loop free alternate (RLFA) backup path in a network. A network device configured with MoFRR calculates both a primary path and a backup path in a network to provide resilience, and performs a switchover (fast reroute) to the backup path in the case of a failure in the primary path. In some cases, the backup path may be a RLFA backup path that directs traffic to a remote node (i.e., a node that is not a direct neighbor of the network device) to avoid unicast traffic looping in the backup path. If mLDP is used to signal the RLFA backup path, however, multicast join looping may occur in the backup path and, in some cases, the backup path may not be established.

According to the techniques of this disclosure, an egress network device (e.g., a router) of a mLDP network is configured to generate a modified mLDP control message to signal the RLFA backup path, where the mLDP control message is modified as compared to a standard mLDP control message in that an address of a RLFA node of the RLFA backup path is specified in a field of the modified mLDP control message that identifies an address of the root node (e.g., an "LSPRoot field"), instead of an address of an ingress router of the mLDP network. The RLFA node is a PQ node for the egress network device for a protected link that the backup path does not transit. The egress network device specifies the RLFA node's address in the root node field, despite the fact that the RLFA node is not actually the root node of the mLDP LSP being established (rather, the ingress router is the root node). The egress router is further configured to include the address of the ingress router, i.e., the root node address, in an opaque data field of the modified mLDP control message. The egress network device sends the modified mLDP control message to signal/establish the RLFA backup path to the ingress network device.

In addition, the RLFA node of the RLFA backup path is configured such that in response to receiving the modified mLDP control message sent by the egress network device, the RLFA node recognizes that the RLFA node is identified in the LSPRoot field of the modified mLDP control message, and, in response, look up the ingress router identified in the opaque data field of the modified mLDP control message. The RLFA node is further configured to generate an mLDP control message that includes the address of the ingress router in the LSPRoot field, and send the mLDP control message towards the ingress router to complete the establishment of the RLFA backup path. In this way, the disclosed techniques support MoFRR over a RLFA backup path in an mLDP network.

In one example, a method includes receiving, by an egress network device of a network, a request for multicast traffic from one or more receivers; sending, by the egress network device to an ingress network device of the network, a first multicast control message to establish a primary label switched path (LSP) to the ingress network device, the first multicast control message including an address of the ingress network device in a field of the first multicast control message that identifies an address of a root node, sending, by the egress network device to a RLFA network device, a second multicast control message to establish an RLFA backup LSP to the ingress network device, the second multicast control message including an address of the RLFA network device in a field of the second multicast control message that identifies an address of a root node and including the address of the ingress network device in an opaque data field of the second multicast control message; receiving, by the egress network device from the ingress network device, multicast traffic on the primary LSP and the RLFA backup LSP, and forwarding, by the egress network device, the multicast traffic toward the one or more receivers.

In another example, an egress network device includes a routing engine configured to receive a request for multicast traffic from one or more receivers, send, to an ingress network device, a first multicast control message to establish a primary label switched path (LSP) to the ingress network device, the first multicast control message including an address of the ingress network device in a field of the first multicast control message that identifies an address of a root node, and send, to a remote loop-free alternate (RLFA) network device, a second multicast control message to establish an RLFA backup LSP to the ingress network device, the second multicast control message including an address of the RLFA network device in a field of the second multicast control message that identifies an address of a root node and including the address of the ingress network device in an opaque data field of the second multicast control message. The egress network device also includes a forwarding engine configured to receive, from the ingress network device, multicast traffic on the primary LSP and the RLFA backup LSP, and forward the multicast traffic toward the one or more receivers.

In a further example, a method includes receiving, by a remote loop-free alternate (RLFA) network device from an egress network device, a first multicast control message that includes an address of the RLFA network device in a field of the first multicast control message that identifies an address of a root node, and in response to determining that the address of the RLFA network device is included in the field of the first multicast control message, parsing, by the RLFA network device, an opaque data field of the first multicast control message to determine an address of an ingress network device included in the opaque data field of the first multicast control message. The method also includes in response to determining the address of the ingress network device included in the opaque data field, sending, by the RLFA network device to the ingress network device, a second multicast control message to establish an RLFA backup label switched path (LSP) to the ingress network device, the second multicast control message including the determined address of the ingress network device in a field of the second multicast control message that identifies an address of a root node, receiving, by the RLFA network device from the ingress network device, multicast traffic on the RLFA backup LSP, and forwarding, by the RLFA network device, the multicast traffic toward the egress network device along the RLFA backup LSP.

In another example, a remote loop-free alternate (RLFA) network device includes a routing engine configured to receive, from an egress network device, a first multicast control message that includes an address of the RLFA network device in a field of the first multicast control message that identifies an address of a root node, in response to determining that the address of the RLFA network device is included in the field of the first multicast control message, parse an opaque data field of the first multicast control message to determine an address of an ingress network device included in the opaque data field of the first multicast control message, and in response to determining the address of the ingress network device included in the opaque data field, send to the ingress network device, a second multicast control message to establish an RLFA backup label switched path (LSP) to the ingress network device, the second multicast control message including the determined address of the ingress network device in a field of the second multicast control message that identifies an address of a root node. The RLFA network device also includes a forwarding engine configured to receive, from the ingress network device, multicast traffic on the RLFA backup LSP, and forward the multicast traffic toward the egress network device along the RLFA backup LSP.

In a further example, a system includes one or more receivers, an ingress network device of a routing domain, an RLFA network device; and an egress network device of the routing domain, the egress network device including a routing engine configured to receive a request for multicast traffic from the one or more receivers, send, to the ingress network device, a first multicast control message to establish a primary label switched path to the ingress network device, the first multicast control message including an address of the ingress network device in a field of the first multicast control message that identifies an address of a root node, and send, to the RLFA network device, a second multicast control message to establish an RLFA backup LSP to the ingress network device, the second multicast control message including an address of the RLFA network device in a field of the second multicast control message that identifies an address of a root node and including the address of the ingress network device in an opaque data field of the second multicast control message. The RLFA network device is positioned along the RLFA backup LSP to the ingress device, the RLFA network device including a routing engine configured to receive, from the egress network device, the second multicast control message, and in response to determining that the address of the RLFA network device is included in the field of the second multicast control message, parse the opaque data field of the second multicast control message to determine the address of the ingress network device included in the opaque data field of the second multicast control message, and in response to determining the address of the ingress network device included in the opaque data field, send to the ingress network device, a third multicast control message to establish the RLFA backup LSP to the ingress network device, the second multicast control message including the determined address of the ingress network device in a field of the second multicast control message that identifies an address of a root node.

The details of one or more examples of the disclosure are set forth in the accompanying drawings and the description below. Other features, objects, and advantages of the disclosure will be apparent from the description and drawings, and from the claims.

DETAILED DESCRIPTION

Remote Loop Free Alternates (RLFA) is a mechanism by which unicast traffic loops are avoided on a backup path within a network. Multicast Label Distribution Protocol (mLDP) In-Band-Signaling is a protocol by which multicast join path is signaled using MPLS FECs and multicast forwarding is performed using labelled multicast forwarding routes. Multicast Only Fast Re-route (MoFRR) is a mechanism by which multiple join paths (primary and secondary) are signaled for resilience and switchover to secondary path is performed in case of failure with the primary.

Today, in RLFA scenarios, when customers deploy mLDP in-band-signaling and look to provide resilience using MoFRR, this may become a challenge because of inherent Multicast Join Looping that occurs in the backup path. In some topologies, it is not possible to form the backup path at all.

To address the problem, the mechanisms that are used for unicast cannot be inherited for multicast and this problem remains unsolved yet. This disclosure looks to address the problems in such a way that mLDP MoFRR can work as desired (without looping) in RLFA environments.

This disclosure first describes how Unicast RLFA works. Then, the disclosure explains mLDP in-band-signaling functionality and mLDP MoFRR basics and then moves on to the description of the problem and example solutions. In this document, mLDP refers to MLDP In-Band-Signaling procedures and not MLDP provider-tunnels in BGP-MVPN. mLDP is a control protocol used for constructing Point-to-Multipoint (P2MP) and Multipoint-to-Multipoint (MP2MP) Label Switched Paths, collectively referred to as multipoint LSPs ("MP LSPs"). mLDP join messages (label mapping messages) contain a field that identifies the address of a "root node" of the MP LSPs. Intermediate nodes are expected to be able to look up the root node address in their routing tables.

Figure 1:
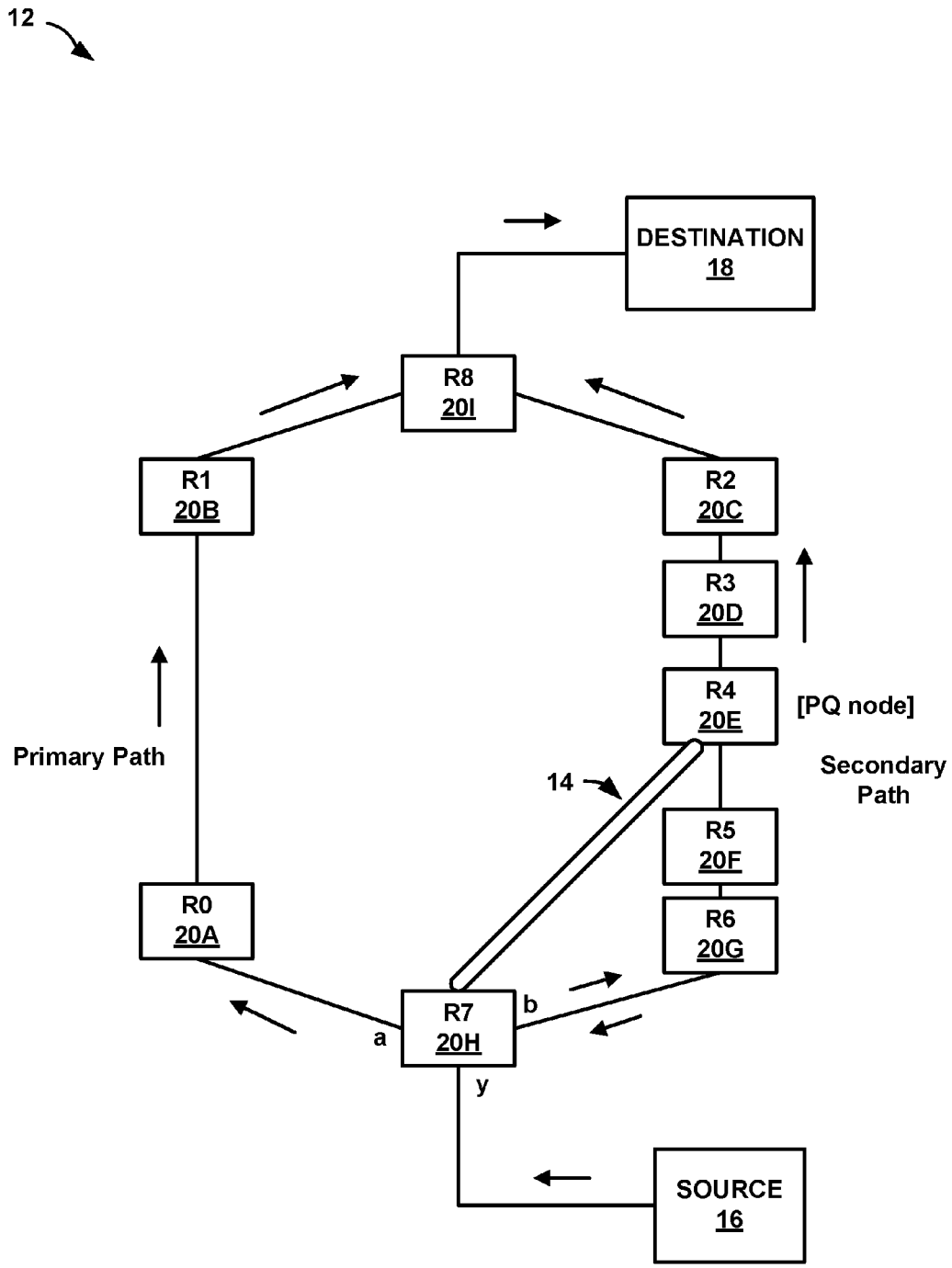
FIG. 1 is a block diagram illustrating an example computer network including a plurality of network devices configured to perform a local repair using unicast RLFA mechanisms.

FIG. 1 is a block diagram illustrating an example computer network 12 including a plurality of network devices configured to perform a local repair using unicast RLFA mechanisms. The network of FIG. 1 includes a plurality of network devices, including source 16, destination 18, and routers 20A-20I ("routers 20").

The illustrated network may comprise a private network or a public network, such as the Internet. For example, the network may be an enterprise network, a campus network, a service provider network, a home network, a local area network (LAN), a virtual local area network (VLAN), virtual private network (VPN), or another autonomous system. In any of these examples, remotely located source 16 and destination 18 may share data via the network. In an example of the network as an enterprise network, each of source 16 and destination 18 may comprise one or more servers or employee computer terminals located in different regions of a single office location, or may comprise a remote office location of a corporation. Each of source 16 and destination 18 may be included in a remote site (not shown) that may be a local area network (LAN) or a wide area network (WAN) comprising a plurality of subscriber devices, such as desktop computers, laptops, workstations, PDAs, wireless devices, network-ready appliances, file servers, print servers or other devices. The remote sites may be configured to support multicast traffic, such as Internet Protocol Television (IPTV), desktop conferences, corporate broadcasts, music and video web casts, and other forms of multimedia content.

LFA (Loop Free Alternative) is a mechanism of local repair, wherein, upon failure of the primary link on which the traffic flows, traffic is switched to an alternate neighbor from where the traffic reaches the destination without looping back to primary. In some topologies however, a directly-attached neighbor that can forward traffic without looping back to source does not exist.

With respect to FIG. 1, consider R7 20H to be the device under test (DUT), and 'a' be the interface to be protected. In order to reach destination R8 20I, it is clear that R7 cannot choose R6 to be the backup neighbor as R6 will loopback the traffic to R7 according to its SPF lookup. The RLFA solution is to direct the traffic to a "safe-remote-node" that is guaranteed to forward the traffic to the destination via SPF based forwarding without sending it back to the source.

The following are the criteria to find such "safe-remote-node": P-space routers: The P-space of a router with respect to a protected link is the set of routers reachable from that specific router using the pre-convergence shortest paths, without any of those paths (including equal cost path splits) transiting that protected link. That is, P-space (S, L1) is the set of routers which can be reached from S without traversing the link being protected (L1). P-space can be obtained, for example, by computing a shortest path tree (SPT) rooted at S and excising the sub-tree reached via the link S-E (including those which are members of an ECMP). For example, the P-space of source node 16, is the set of routers that source node 16 can reach without using the protected link.

Extended P-space is defined as the union of the P-space of the neighbors of a specific router with respect to the protected link, where the P-space is the set of network devices reachable from a specific network device without any path, including equal cost path splits, transiting the protected link. That is, extended P-space(S): P-space(S)+P-space (router other than primary neighbor).

Q-space routers: Q-space of a router with respect to a protected link is defined as the set of routers from which that specific router can be reached without any path including equal cost path splits) transiting that protected link. Q-space can be obtained, for example, by computing a reverse shortest path tree (rSPT) rooted at E, with the sub-tree which traverses the failed link excised (including those which are members of an ECMP).

The nodes in the intersection of Extended-P-space and Q-Space are called the PQ-nodes. That is, a PQ node is defined as a node which is a member of both the extended P-space and the Q-space. The set of PQ nodes of S are candidates for the remote LFA node. The Repair tunnel 14 is defined as a tunnel established for the purpose of providing a virtual neighbor which is a Loop Free Alternate. The Remote LFA is defined as the tail-end of a repair tunnel. This tail-end is a member of both the extended-P space and the Q space. It is also termed a "PQ" node.

In the above example, again considering 'R7' as the DUT and 'a' as the protected link, 'R4' 20E is the PQ-node. This is because traffic can be tunneled to 'R4' on SPF path and from 'R4,' native SPF lookup can forward traffic to destination 'R8', without looping back to source.

RLFA mechanism significantly increases LFA coverage in most networks. While regular LFA typically gives only 60% coverage, RLFA give coverage upwards of 85% in a typically network. Additional information regarding LFA for unicast traffic may be found in Atlas, A., et al., "Basic Specification for IP Fast Reroute: Loop-Free Alternates," RFC 5286, September 2008, the entire contents of which are incorporated by reference herein. Additional information regarding RLFA for unicast traffic may be found in Bryant, S., et al., "Remote Loop-Free Alternate (LFA) Fast Reroute (FRR)," RFC 7490, April 2015, the entire contents of which are incorporated by reference herein.

Figure 2:
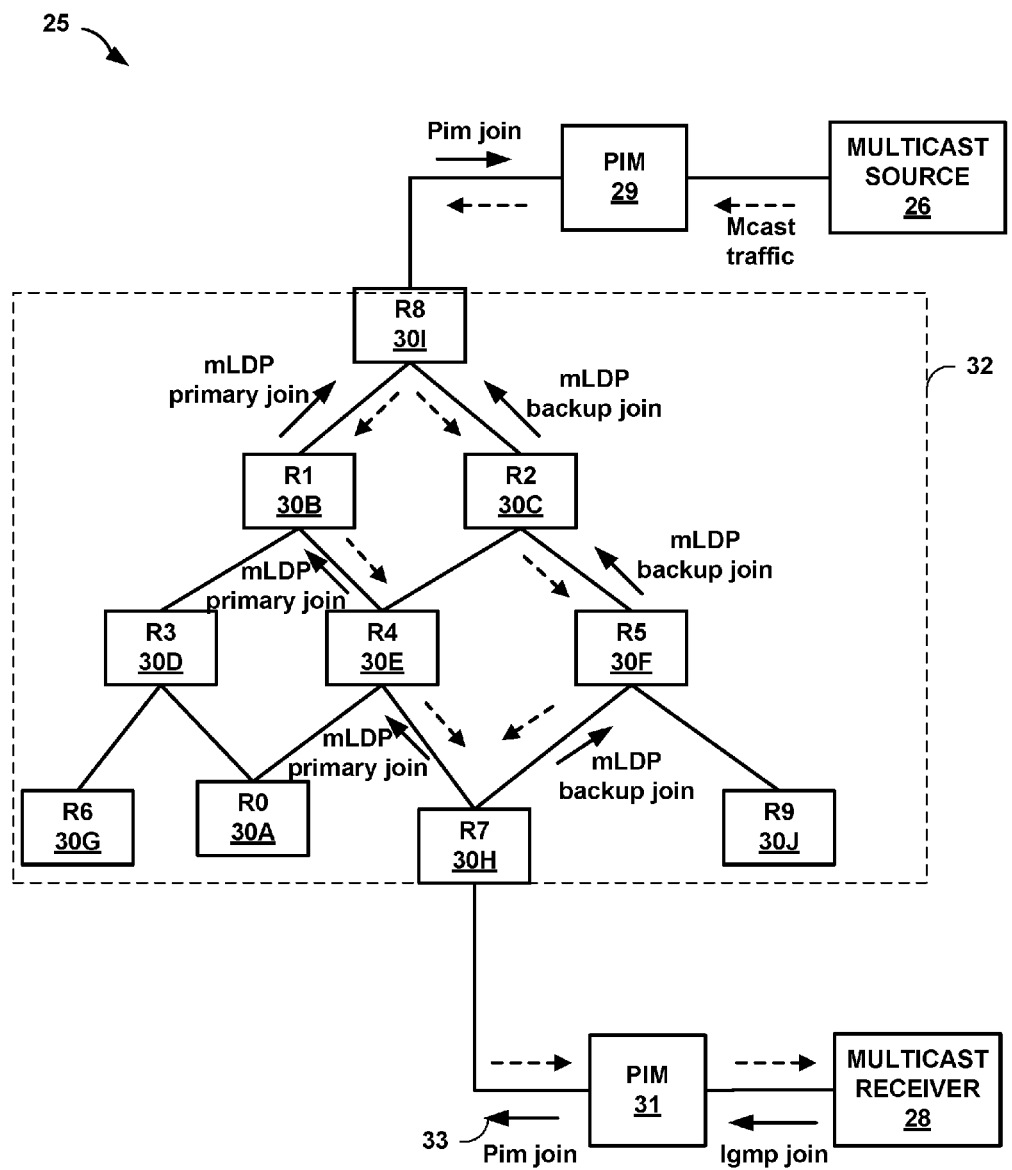
FIG. 2 is a block diagram illustrating an example computer network including a plurality of network devices configured to perform mLDP MoFRR.

FIG. 2 is a block diagram illustrating an example computer network 25 including a plurality of network devices configured to perform mLDP MoFRR. The network of FIG. 2 includes a plurality of network devices, including multicast source 26, multicast receiver 28, and routers R0-R9 30A-30J ("routers 30"). As described with respect to FIG. 1, the illustrated network of FIG. 2 may comprise a private network or a public network, such as the Internet. In addition, each of multicast source 26 and multicast receiver 28 may be included in a remote site.

In this section, this disclosure describes how mLDP works in typical topologies. mLDP is described in further detail by Wijnands, I J., et al., "Label Distribution Protocol Extensions for Point-to-Multipoint and Multipoint-to-Multipoint Label Switched Paths," RFC 6388, November 2011, the entire contents of which are incorporated by reference herein.

In some examples an IP multicast tree, constructed by Protocol Independent Multicast (PIM), passes through mLDP network 32, an MPLS domain in which Multipoint LDP (mLDP) Point-to-Multipoint and/or Multipoint-to-Multipoint Labels Switched Paths (LSPs) can be created. The part of the IP multicast tree that traverses the MPLS domain can be instantiated as a multipoint LSP. When a PIM Join message 33 is received by R7 30H at the border of the MPLS domain, R7 30H encodes information from PIM Join message 33 into mLDP messages. When the mLDP messages reach the border of the next IP domain, the encoded information is used to generate PIM messages that can be sent through the IP domain. The result is an IP multicast tree consisting of a set of IP multicast sub-trees that are spliced together with a multipoint LSP.

Multipoint LSPs created using mLDP are typically used for transporting end-user multicast packets. However, the mLDP specification does not provide any rules for associating particular end-user multicast packets with any particular LSP. There are other applications in which out-of-band signaling protocols, such as PIM and BGP, are used to establish the mapping between an LSP and the multicast packets that need to be forwarded over the LSP. This disclosure describes the use of in-band signaling mechanisms, in which the information needed to establish the mapping between an LSP and the set of multicast packets to be forwarded over it is carried in the "opaque value" field of an mLDP FEC (Forwarding Equivalence Class) element. When an IP multicast tree (either a source-specific tree or a bidirectional tree) enters the MPLS network the (S,G) or (*,G) information from the IP multicast control plane state is carried in the opaque value field of the mLDP FEC message. As the tree leaves the MPLS network, this information is extracted from the FEC element and used to build the IP multicast control plane. PIM messages can be sent outside the MPLS domain.

Further details of in-band signalling with mLDP are described in Wijnands, "Multipoint LDP in-band signaling for Point-to-Multipoint and Multipoint-to-Multipoint Label Switched Paths," draft-ietf-mpls-mldp-in-band-signaling-08, Network Working Group Internet-Draft, Nov. 29, 2012, the entire contents of which are incorporated by reference herein.

With respect to FIG. 2, the routers R0-R9 are part of a mLDP network 32 used to carry multicast traffic in accordance with mLDP. Here, R8 is the ingress and R0, R6, R7 and R9 are egress network devices of the mLDP netowrk 32. The receiver interest comes in to the Egress from either PIM (typically) or IGMP Joins. The portions of system 25 that communicate multicast control messages in accordance with the PIM Protocol are referred to herein as the "PIM domain," while the portions of system 25 that communicate multicast control messages in accordance with mLDP are referred to herein as the mLDP domain (i.e., mLDP network 32).

When the egress router receives a downstream Join message, looks up the route to Source and if the egress router finds that the path is via a mLDP router, the Egress will translate the PIM Join to a mLDP mapping message (also referred to herein as an "mLDP Join message").

The mLDP mapping message (aka FEC) will contain the LSPRoot field, which specifies an address of the Ingress in the mLDP network, here R8. It will also contain an opaque data field which contains the receiver's interest multicast (S,G) information. This mLDP mapping message will travel hop-by-hop towards the Ingress. On the Ingress, this mLDP Jon will be translated to a corresponding PIM Join and sent towards the source.

When each of the mLDP routers 30 forms the FEC with the LSPRoot and the opaque data field, it will advertise a label towards the upstream. This label is used to build the 'labelled multicast forwarding route' on each of the mLDP routers in the path. This labelled multicast forwarding route will have the below information. (i) a Label (which it has advertised to its upstream) and (ii) the list of downstream interfaces where the traffic coming on the upstream with the label has to be forwarded.

In this section, the disclosure further describes how mLDP MoFRR works. If MoFRR is not used in multicast networks and if any failures happen in the multicast path, it can take a substantial time before a new path is formed and traffic to resume. This is because, (i) the failure has to be detected which itself takes quite some time and (ii) a new path has to be formed (which takes a substantial amount of time). To overcome this problem, MoFRR is used by building two paths beforehand and switching over as soon as failure is detected.

MoFRR is deployed in many production networks for better resiliency and convergence. As illustrated in FIG. 2, the Egress will form two Join paths by sending one Join message (primary) over one path and another Join message (backup) over another path (if available). In this case, R7 sends a mLDP Join message towards R4 (primary) and another mLDP Join message towards R5 (backup). Traffic will be forwarded on both paths by virtue of the Joins being sent. The Egress R7 receives the traffic on both the primary path and the backup path, and the egress R7 will forward the traffic from primary towards the downstream and drop the traffic coming over the backup path without forwarding towards the downstream. Additional information regarding MoFRR may be found in Karan, A., et al., "Multicast only Fast Re-Route," draft-ietf-rtgwg-mofrr-04, IETF Internet-Draft, Network Working Group, May 14, 2014 (hereinafter referred to as "draft-karan,"), the contents of which are incorporated herein by reference.

When a network failure event occurs in the primary path, the traffic will be forwarded from the secondary path which is already formed. This network failure event could be a node failure or a link failure in the path. There are several ways of detection of the failure. The immediate connected node and link failures can be detected in forwarding plane for quicker resilience. Another method of determining failure is to monitor the rate of the traffic on the primary. If the traffic rate falls below a particular threshold, then the egress will switch over to the backup path.

Figure 3:
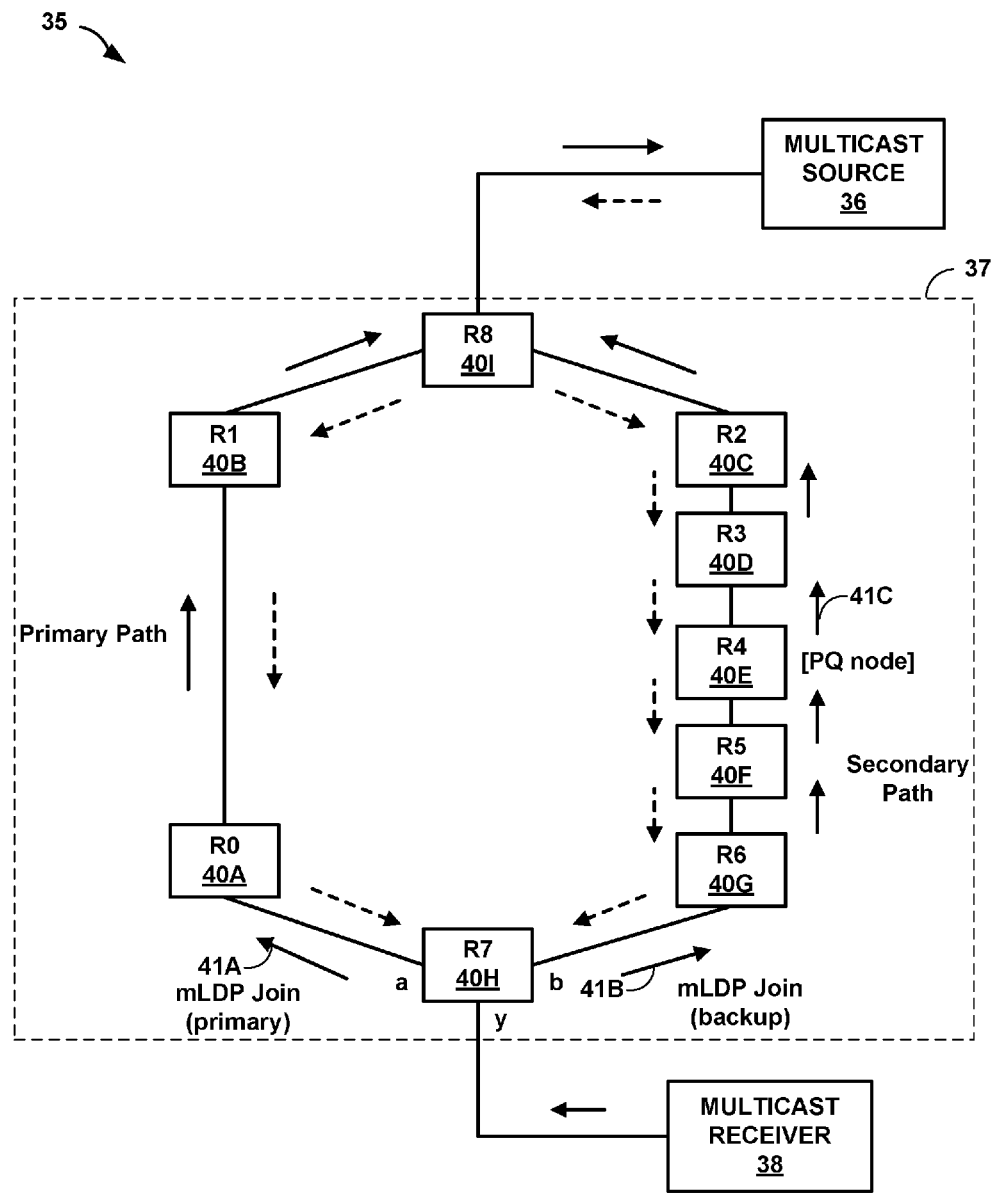
FIG. 3 is a block diagram illustrating an example computer network including a plurality of network devices configured to perform mLDP MoFRR over a RLFA backup path, in accordance with techniques of this disclosure.

FIG. 3 is a block diagram illustrating an example computer network 35 including a plurality of network devices configured to perform mLDP MoFRR over an RLFA backup path, in accordance with techniques of this disclosure. The network of FIG. 3 includes a plurality of network devices, including multicast source 36, multicast receiver 38, and routers (R0-R8) 40A-40J ("routers 40"). As described with respect to FIG. 1, the illustrated network of FIG. 3 may comprise a private network or a public network, such as the Internet. In addition, each of multicast source 36 and multicast receiver 38 may be included in a remote site.

With respect to FIG. 3, the routers R0-R8 are part of a mLDP network 37 used to carry multicast traffic in accordance with mLDP. In the topology of FIG. 3, when R7 receives a downstream Join (PIM or IGMP), R7 performs a route lookup to the Source 36. R7 finds two paths towards the source (one towards R0 and another towards R6). R7 sends an mLDP Join message 41A towards R0 (primary) and another mLDP Join message 41B towards R6 (backup). R0 receives the mLDP join message 41A and looks up the route to Source 36 and sends the mLDP Join message towards R1, R8 and Source 36. R0 also forwards multicast traffic down this path to R7.

When R6 receives the mLDP Join message 41B on the backup path, R6 performs a route lookup towards Source 36 and determines that its nexthop is R7 itself. This is by virtue of its unicast view of the topology. In the absence of the techniques of this disclosure, R6 would send its Join message back to R7, thus looping back the Join message. Because of R6's view of the topology, the backup path does not get formed at all.

Eventually, when there is a fault in the primary path (one of the links or nodes in the primary path goes down or rate of traffic falls below threshold), there is no pre-formed backup available. This can result in traffic loss until the topology is converged again. This behavior is undesirable. The very rationale of deploying MoFRR is not realized. The described topology and behavior is quite common in deployments. This effort looks to address the above problem.

Figure 8:
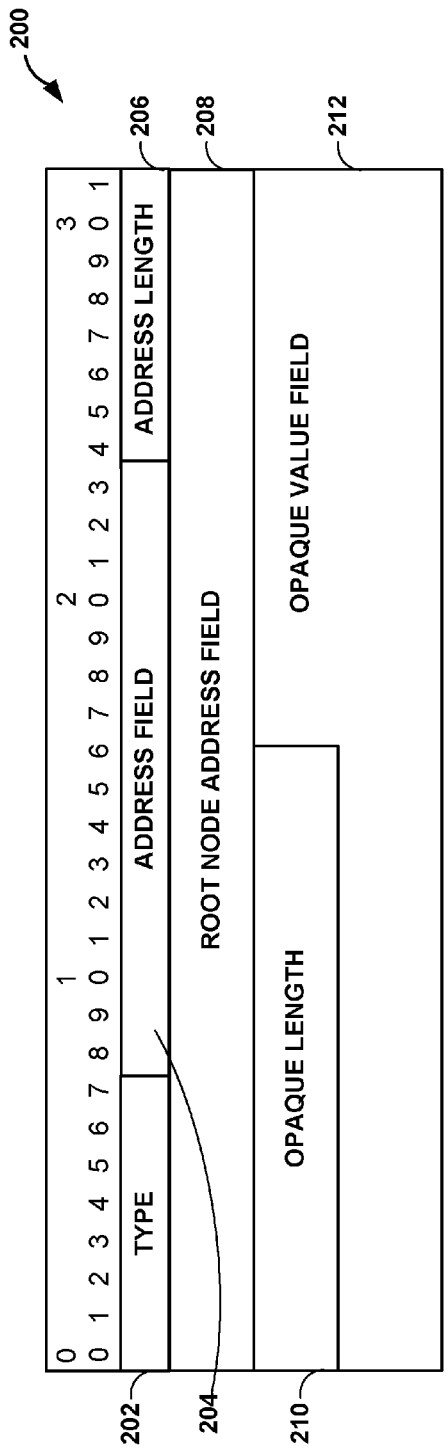
FIG. 8 is a block diagram illustrating an example FEC element encoding for an MLDP join message sent by an egress network device to an ingress network device to establish a primary path to the ingress network device.

Today, mLDP join messages are of the format illustrated in FIG. 8, having an LSP Root field and an Opaque field. The LSP Root field ("LSPRoot") usually contains the Ingress router address, i.e., the exit router to choose to reach the Source. In this case, the LSP Root field is R8. The opaque field usually contains the multicast (S,G) information, which the transit routers are oblivious of due to the fact that the transit routers do not examine the contents of the opaque field. The transit routers look at the LSP Root field and forward the mLDP Join based on its route lookup to the LSP Root. When R6 does a route lookup towards R8 (LSPRoot), R6 finds R7 as the nexthop and thus the problem occurs, i.e., that of the backup mLDP Join not being formed appropriately.

As described in the section above describing unicast RLFA (with respect to FIG. 1), R7 can determine the PQ node such that, if the unicast packets are sent to the PQ node, the packets will not be looped. This is by virtue of the determination of the PQ node in the unicast RLFA context. In FIG. 3, R4 is the PQ node in R7's unicast RLFA point of view.

For multicast, if the egress R7 is able to send the mLDP Join successfully to the PQ node R4 and the PQ node is able to send the Join to Ingress, then the problem can be solved, i.e., the routers in the backup path should be able to pick the correct non-looped path towards the Ingress to form the backup Path. If this is assured, this problem of Join looping can be solved effectively.

The solution for the problem comprises one or more of the following: On egress, replace the LSP Root value in the field in the mLDP Join message 41B with the address of the PQ node (e.g., IP address). This way, the mLDP Join will progress towards the PQ node without getting looped. In the example of FIG. 3, R7 replaces R8 in LSPRoot field in mLDP join message 41B with R4 PQ.

On egress, include the LSP Root value in the opaque data field of mLDP join message 41B. This is needed so that the PQ node can determine the LSPRoot from the mLDP Join. The intermediate PQ node might not have a route to the Multicast Source to determine the LSP Root. In the example of FIG. 3, R7 includes R8 LSP Root in the opaque data field.

On the PQ node, in response to receiving the mLDP join message, look up the LSP Root value in the opaque data field (populated in (ii) above) and send out the mLDP Join towards the LSP Root. In the example of FIG. 3, R4 parses the opaque data field, looks up R8 in the opaque data field and sends out the mLDP Join towards R8.

The multicast traffic is forwarded down the backup path formed using the above mechanism and MoFRR works well. When such a backup mLDP Join 41B reaches the PQ node, the PQ node determines that the backup mLDP Join is a mLDP Join for itself because the LSPRoot field has been replaced to PQ node by the egress.

The PQ node will examine the opaque data field and realize that there is a LSP Root value included in the opaque data field of the message 41B. Now the PQ node will send out a mLDP join towards the LSP Root and forward traffic downstream on the backup path.

Characteristics of the above described solution include the following: Only the egress router (R7) and the PQ need to be configured with this new functionality (e.g., configured to understand the extensions to mLDP described herein).

If the problem were to be solved similar to how unicast addresses by building virtual tunnel interfaces between the Egress and the PQ nodes, this may result in several state and scaling related issues. There have been problems when the unicast tunnels go in the order of 100s and if a similar approach is incorporated for multicast where the flows will be in order of 1000s, hardware and scaling problems may occur. The solution described herein is simple and needs no special hardware support. The mechanics of backup path are taken care of in the Control Plane with fewer upgrades needed. The solution is very scalable and does not require virtual tunnel interfaces that require special hardware and have known scaling issues.

Transit routers are oblivious of the change and need no upgrade. They just forward the mLDP join messages towards the PQ node instead of the LSP Root. This is by virtue of replacement of the LSP Root with the PQ node by the egress. Loops are avoided and the backup MoFRR path is appropriately formed.

Because the LSP Root field is replaced with the PQ node value, this results in a different FEC and a different forwarding route, thus making it simpler when different egresses pick different PQ nodes for the same multicast flow (S,G), i.e., if R7 picks R4 as the PQ node and if R0 picks R3 as the PQ node for the same LSPRoot-R8 for same (S,G), multiple FECs are formed by virtue of the replacement of LSP Root with PQ node value.

By virtue of different FECs and multicast forwarding labelled paths getting formed, this provides good coverage against failures. Instead of relying on upstream interface for MoFRR (which is how PIM MoFRR works), using labelled forwarding routes based on FECs may make mLDP MoFRR more robust. This is further enhanced by creating different FECs for each desired backup path. This backup path using this solution is similar to a distinct backup LSP in the unicast world.

RFC 6512 which describes how multiple FECs are encoded recursively. This RFC uses the recursive encoding mechanism to solve a different problem (to carry the mLDP Joins across a BGP-free core). RFC 6512 builds multiple FECs one on top of another recursively: [Outer LSPRoot, (opaque+S,G)] [Inner LSPRoot (opaque+S,G)].

In contrast, in the approach described herein the encoding is as below:

[PQ, (opaque (LSPRoot), (S,G))]

With the encoding mechanism described in this disclosure, there may be an improvement over RFC 6512. In our encoding, there is no need for unnecessary duplication of the (S,G) in the opaque data field. Also, the opaque data field remains the same between the egress and the PQ as well between the PQ node and the Ingress.

In general, the egress need not be restricted to a single PQ node. If the egress had the capability to direct the path using two intermediate PQ nodes, the above described procedures will hold good.

Figure 4:
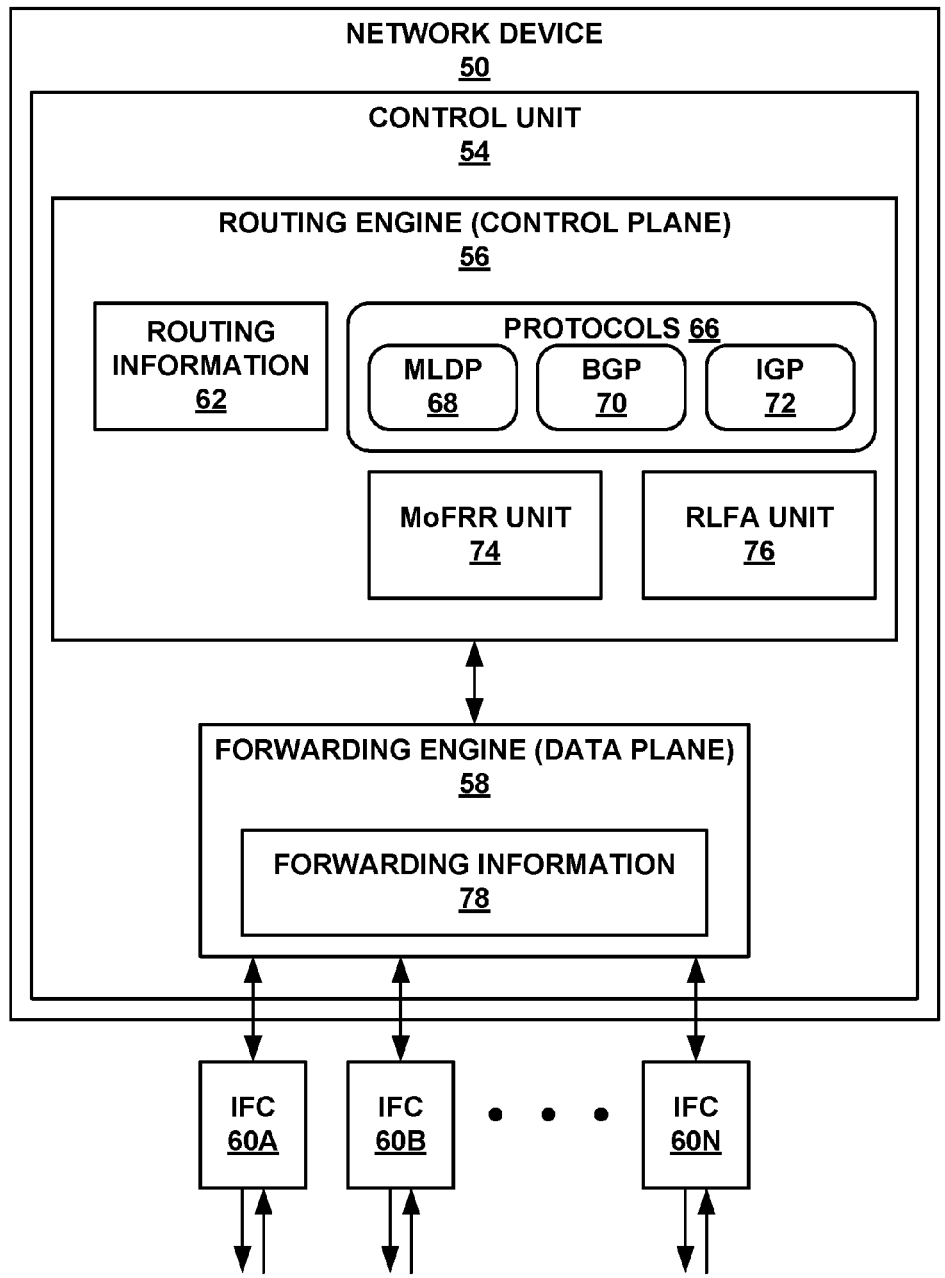
FIG. 4 is a block diagram illustrating an example network device including a MoFRR unit and a RLFA unit.

FIG. 4 is a block diagram illustrating an example network device including a MoFRR unit 74 and a RLFA unit 76. In one example, network device 50 may operate as an egress network device configured to initiate establishment of a primary path and a RLFA backup path toward an ingress network device to provide MoFRR over the RLFA backup path. In another example, network device 50 may operate as a RFLA network device or PQ node of the RLFA backup path configured to propagate multicast control messages to establish the RLFA backup path.

In the illustrated example of FIG. 4, network device 50 includes interface cards 60A-60N ("IFCs 60") that receive multicast control and data packets via incoming links and send multicast packets via outbound links. IFCs 60 are typically coupled to the incoming links and the outbound links via a number of interface ports. Network device 50 also includes a control unit 54 that determines routes of received packets and forwards the packets accordingly via IFCs 60.

Control unit 54 includes a routing engine 56 and a forwarding engine 58. Routing engine 56 operates as the control plane for network device 50 and includes an operating system (not shown) that may provide a multi-tasking operating environment for execution of a number of concurrent processes. For example, routing engine 56 provides an operating environment for various protocols 66 that perform routing functions for network device 50. In the illustrated example of FIG. 4, routing engine 56 includes a border gateway protocol (BGP) 70 and an interior gateway protocol (IGP) 72 as unicast routing protocols used to exchange routing information with other network devices in a network in order to discover the network topology and update routing information 62. In some examples, IGP 72 may be a link-state routing protocol such as open shortest path first (OSPF) or intermediate system-intermedia system (IS-IS). In addition, routing engine 56 includes mLDP module 68 as a multicast routing protocol used to build multicast distribution trees with the other network devices in the network using routing information 62.

Routing information 62 may describe the topology of the network in which network device 50 resides, and may also describe various routes within the network and the appropriate next hops for each route, i.e., the neighboring network devices along each of the routes. Routing engine 56 analyzes routing information 62 to generate forwarding information 78 installed in forwarding engine 58. Forwarding engine 58 provides data plane functionality for network device 50. Although not shown in FIG. 3, forwarding engine 58 may comprise a central processing unit (CPU), memory and one or more programmable packet-forwarding application-specific integrated circuits (ASICs). Forwarding information 78 associates network destinations with specific next hops and corresponding ports of IFCs 60.

According to the techniques of this disclosure, routing engine 56 of network device 50 is configured to perform MoFRR over an RLFA backup path using mLDP 68, MoFRR unit 74, and RLFA unit 76. More specifically, the disclosed techniques include enhancement to mLDP 68 to support MoFRR over a RLFA backup path. MoFRR unit 74 may control the MoFRR mechanisms performed by network device 50. For example, MoFRR unit 74 may calculate a shortest path toward an ingress network device as a primary path, and calculate an alternative path toward the ingress network device as a backup path. RLFA unit 76 may control the RLFA mechanisms performed by network device 50. For example, RLFA unit 76 may identify a RLFA network device in the network that is capable of forwarding traffic toward the ingress network device without looping back to network device 50. In this way, RLFA unit 76 may enable MoFRR unit 74 to calculate a RLFA backup path.

When operating as an egress router of a mLDP network, network device 50 is configured to use mLDP 68 to generate a modified mLDP control message to signal the RLFA backup path in which an address of a RLFA node of the RLFA backup path is included in a LSPRoot field of the modified mLDP control message, instead of an address of an ingress router of the mLDP network. In this case, network device 50 is further configured to use mLDP module 68 to include the address of the ingress router in an opaque data field of the modified mLDP control message.

In addition, when operating as the RLFA node of the RLFA backup path, network device 50 is configured to use mLDP module 68 to recognize that network device 50 is identified in the LSPRoot field of the modified mLDP control message, and, in response, look up the ingress router identified in the opaque data field of the modified mLDP control message. In this case, network device 50 is further configured to use mLDP module 68 to generate an mLDP control message that includes the address of the ingress router in the LSPRoot field, and send the mLDP control message towards the ingress router to complete the establishment of the RLFA backup path.

The architecture of network device 50 illustrated in FIG. 3 is shown for example purposes only and should not be limited to this architecture. In other examples, network device 50 may be configured in a variety of ways. In one example, some of the functionally of control unit 54 may be distributed within IFCs 60. Control unit 54 may be implemented solely in software, or hardware, or may be implemented as a combination of software, hardware, or firmware. For example, control unit 54 may include one or more processors which execute software instructions. In that case, the various software modules of control unit 54 may comprise executable instructions stored on a computer-readable medium, such as computer memory or hard disk.

Figure 5A:
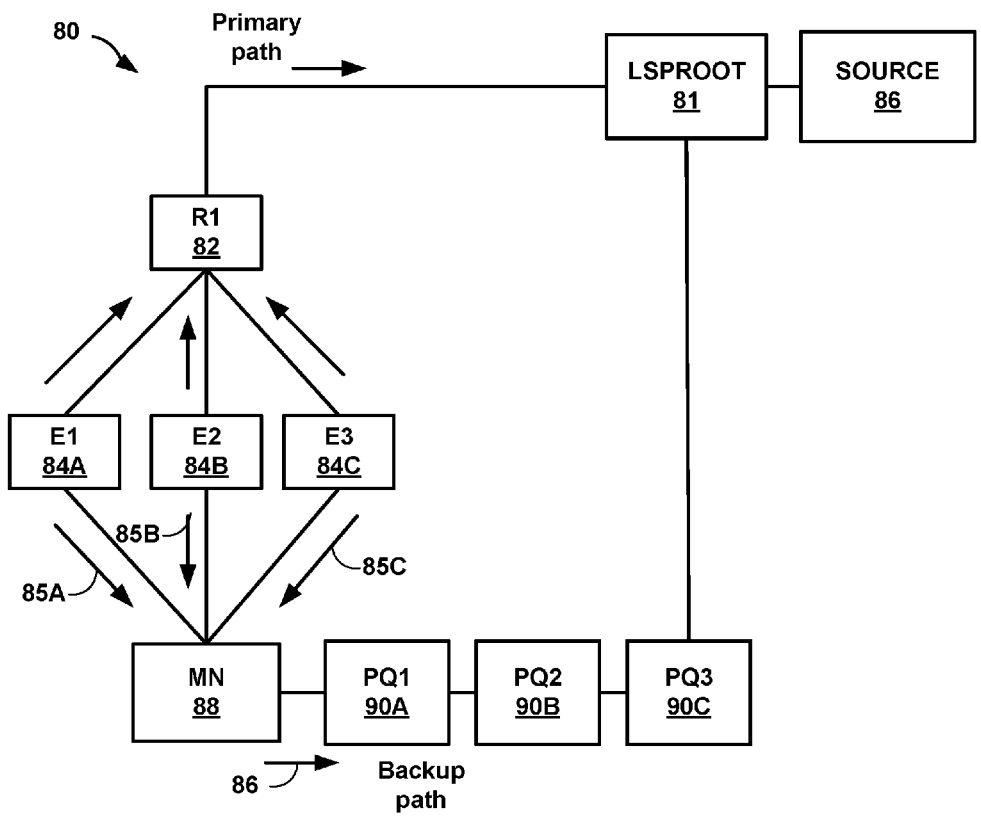
FIG. 5A is a block diagram illustrating one example computer network including a plurality of network devices configured to perform mLDP MoFRR over a RLFA backup path that may benefit from merging behavior.

FIG. 5A is a block diagram illustrating one example computer network 80 including a plurality of network devices configured to perform mLDP MoFRR over a RLFA backup path that may benefit from merging behavior. The network of FIG. 5A includes a plurality of network devices, including source 86, LSP root 81, R1 82, egress routers E1 84A, E2 84B, and E3 84C ("routers 84"), merge node (MN) 88, and PQ1 90A, PQ2 90B, and PQ3 90C ("PQ nodes 90"). PQ nodes 90 may also be referred to as "RLFA network devices." As described with respect to FIG. 1, the illustrated network of FIG. 5A may comprise a private network or a public network, such as the Internet. In addition, source 86 may be included in a remote site.

In most tree based topologies, the above described scheme works very well as desired. Sometimes, in specific topologies like Ring, it might be necessary to not have multiple labelled backup paths go over the same set of Routers that are traversed over a straight line. This is because multiple forwarding routes get created for the same (S,G), if different egresses pick different PQ nodes for the same LSP Root. This can cause bandwidth overuse if many such egresses pick different PQ nodes on the path. Typically, this is not a problem as the unicast PQ node determination will try to synchronize the PQ node as much as possible. Yet, if this is not the case, there is room for the optimization of the solution. If bandwidth considerations are not a problem, then the solution described above works very well and has many benefits in terms of reliability and coverage.

Consider the topology illustrated in FIG. 5A. Per the solution described above, this disclosure illustrates how the Join messages travel in this topology. Say, egress routers E1 84A, E2 84B, and E3 84C are three egresses and their master mLDP joins go over R1. For the backup paths, the different egress pick three different PQ nodes, e.g., egress routers E1 84A, E2 84B, and E3 84C pick PQ1 90A, PQ 90B, and PQ 90C, respectively. The Joins reach the router, say MN 98 and proceed in the same path towards the LSP Root as three different FECs. This is by virtue of the solution of replacing LSP Root with the PQ node by the egress. So, for the same multicast flow (S,G), the different FECs are created and traffic is pulled over three different LSP Paths. This might be undesirable and is a good candidate for optimization.

In FIG. 5A, if the node to which the three egresses send their backup joins, say MN 88, is capable of merging the three FECs and sending forward only one join message 86 having one FEC, MN 88 would have optimized the number of FECs and LSPs that would otherwise be potentially created. The node, say MN (merge node) 88, should ensure that the FECs from the mLDP Joins are indeed merge-eligible and only after MN 88 ensures that they are merge eligible, performs merging.

In one example, the criterion for a node to determine if the FECs are merge-eligible is that the different PQ nodes should be reachable by the same upstream interface. An alternative way to determine the merge-eligibility will be for the node to determine 'if the PQ nodes are reachable over the same interface and also fall in the same line,' i.e., the PQs nodes might be reachable from the same interface but, further down the path, there might be different paths to reach the PQs. In this case, if it can be determined from IGP that to reach [PQ2], the path has to traverse through [PQ1], it can be inferred that the two PQ nodes are in the same line and hence, can be merged. If they are not falling on the same line, they should not be merged.

If this functionality of determining whether two nodes fall in the straight line becomes available in IGP, the Branching functionality (as described below) will not be needed. Since this functionality is not present in IGP today, this disclosure describes the complete solution based on the merge-eligible criteria that 'the PQ nodes should be reachable over same upstream interface.'

Figure 5B:
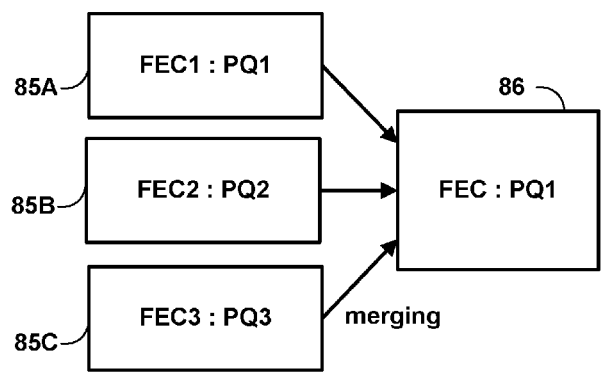
FIG. 5B is a block diagram illustrating FEC merging for the example network of FIG. 5A.

FIG. 5B is a block diagram illustrating the FEC merging for the example network of FIG. 5A. The merging behavior may be described as follows. A node, say MN 86, receives three downstream mLDP Join messages 85A, 85B, and 85C for the same source from three different egresses with different PQs. That is, join message 85A has FEC1: PQ1; join message 85B has FEC2: PQ2; and FEC 85C has FEC3:PQ3. The MN 88 has to now pick a PQ node out of the three and suppress the other two mLDP FECs. In the example of FIG. 5B, the MN 88 picks the FEC for the single mLDP join message 86 as FEC: PQ1. Also, MN 88 has to include the suppressed PQ node values in the opaque data field of join message 86. The need for the inclusion of the suppressed PQ node value in the opaque data field will be explained below.

Figure 6A:
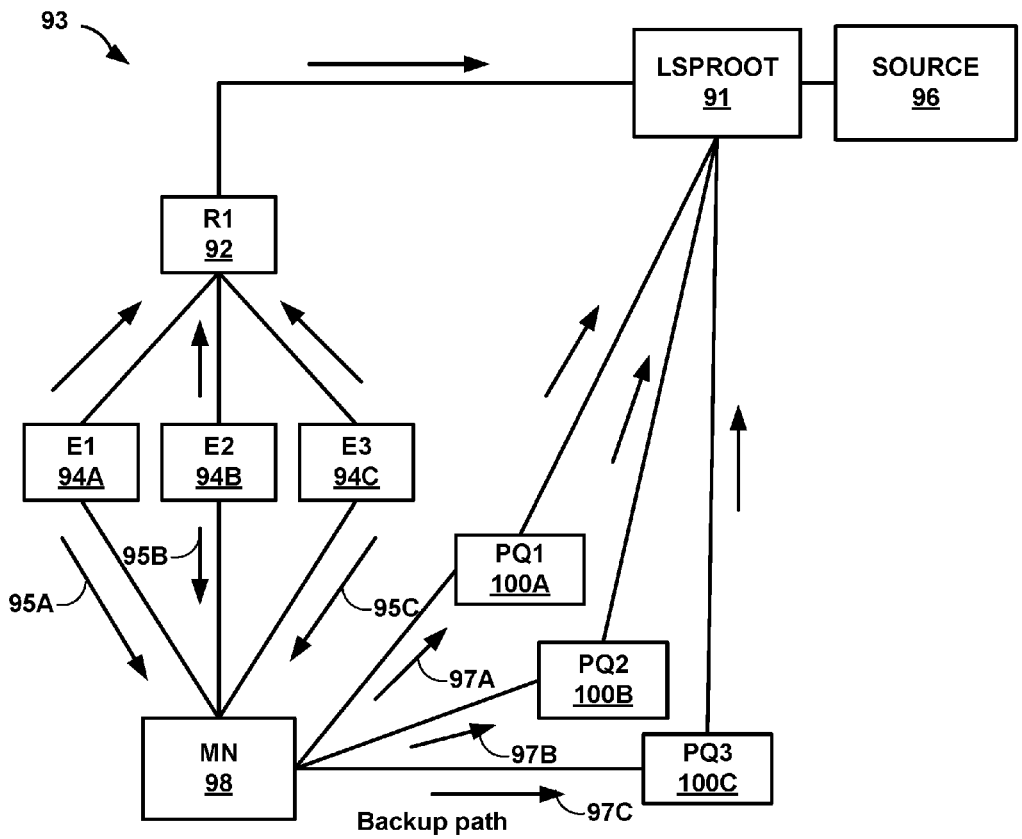
FIG. 6A is a block diagram illustrating another example computer network including a plurality of network devices configured to perform mLDP MoFRR over a RLFA backup path that may not benefit from merging behavior.

FIG. 6A is a block diagram illustrating another example computer network 93 including a plurality of network devices configured to perform mLDP MoFRR over a RLFA backup path that may not benefit from merging behavior. As with many networks in which RLFA is typically deployed, computer network 93 include a ring-like topology. The network of FIG. 6A includes a plurality of network devices, including source 96, LSP root 91, R1 92, egress routers E1 94A, E2 94B, and E3 94C ("routers 94"), merge node (MN) 98, and PQ1 100A, PQ2 100B, and PQ3 100C ("PQ nodes 100"). PQ nodes 100 may also be referred to as "RLFA network devices." As described with respect to FIG. 1, the illustrated network of FIG. 6 may comprise a private network or a public network, such as the Internet. In addition, source 96 may be included in a remote site.

Figure 6B:
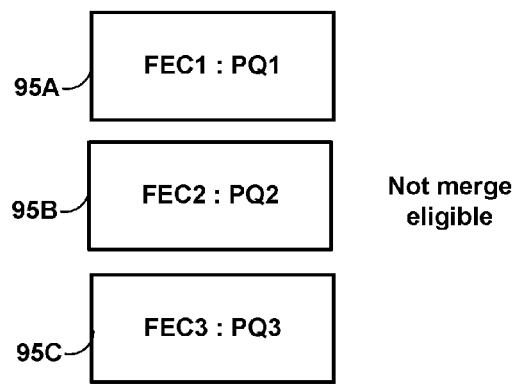
FIG. 6B is a block diagram illustrating the FEC non-merging for the example network of FIG. 6A.

MN 98 receives three mLDP backup join messages 95A-95C. If the PQ nodes are reachable over different interfaces, it is best if the individual FECs are left as is, in order to provide good coverage for the backup MoFRR path. In FIG. 6A, merging should not be performed by MN 98, and MN 98 sends three mLDP backup join messages 97A-97C. In the topology, the different FECs have to be retained because each PQ node is protecting an individual egress. If PQ1 goes down, PQ2 and PQ3 can still forward to E2 and E3 respectively. If merging had been performed in the topology and PQ1 was picked as the PQ, all the egresses would have suffered. FIG. 6B is a block diagram illustrating the FEC non-merging for the example network of FIG. 6A. Thus, as shown in FIG. 6B, good coverage is ensured by not merging in this case.

The Merge Node Behavior may be summarized as follows: A node, say MN, when it receives multiple downstream joins for the same multicast flow, checks if the FECs can be merged.

Criteria for Merge eligibility: The MN should be capable of merging the FECs (this is an optional functionality of the MN). If the egresses require that merging should not be performed, say by setting a flag, merging should not be done.

Configuration of the router to do merging functionality, if present, should be turned on. The route to the different PQ nodes should point to the same upstream interface. Only then, merging should be done. If the PQs are not going over the same upstream interface, merging must not be performed.

As additional examples, merging can include criteria like "Only if one of the PQs is on the protection path of the other, the FECs are merge-eligible". Merging Operation includes the following: Of the different PQs only one PQ node should be selected as the FEC, called elected PQ. This selection could be a local decision. For example, the PQ can be selected based on the one that is farthest from the MN. The selected PQ should be used to replace the LSPRoot. The other FECs should be suppressed. The suppressed PQ node values should be included in the opaque data field such that this information can be made use of by a branching node. Merging is an optional functionality of the node for optimization, if desired. The described solution will work well even if merging functionality is not supported on the routers.

Figure 7:
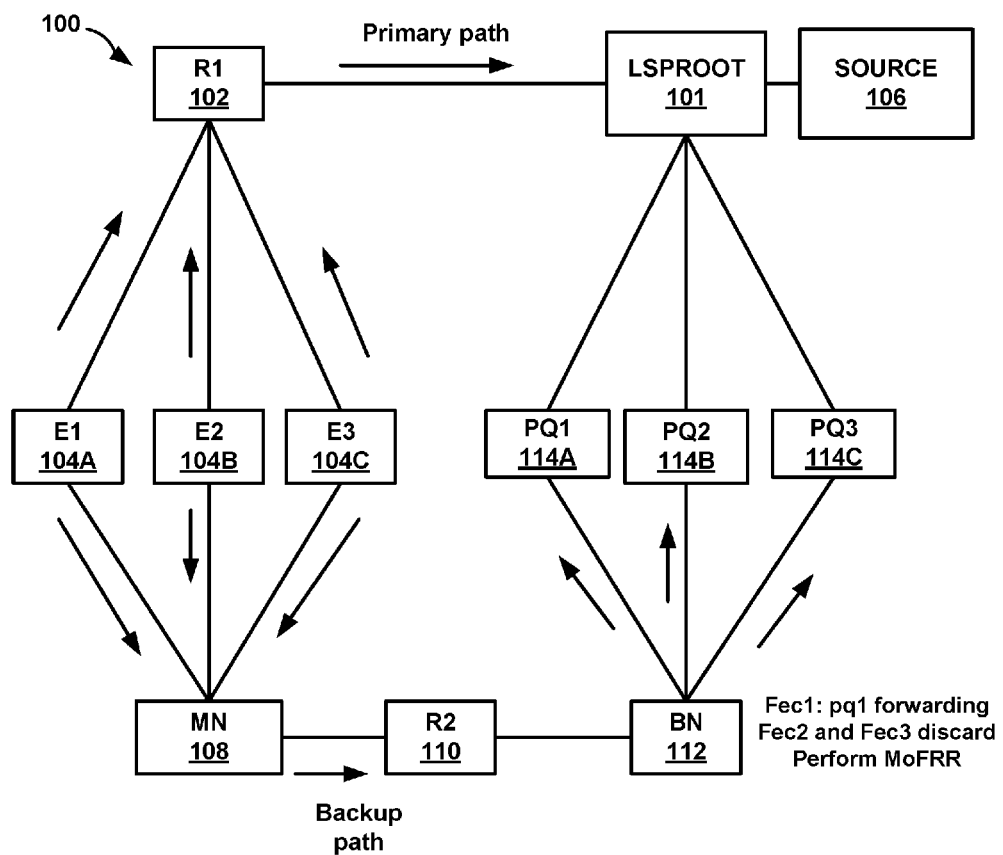
FIG. 7 is a block diagram illustrating a further example computer network including a plurality of network devices configured to perform mLDP MoFRR over a RLFA backup path that may benefit from merging and branching behavior.
Figure 7:
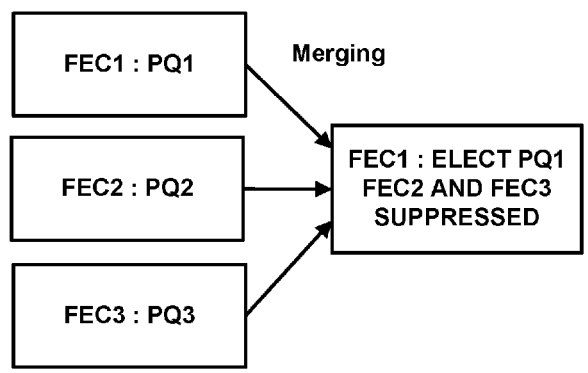

FIG. 7 is a block diagram illustrating a further example computer network 100 including a plurality of network devices configured to perform mLDP MoFRR over a RLFA backup path that may benefit from merging and branching behavior. The network of FIG. 7 includes a plurality of network devices, including source 106, LSP root 101, R1 102, egress routers E1 104A, E2 104B, and E3 104C ("routers 104"), merge node (MN) 108, R2 110, branching node (BN) 112, and PQ1 114A, PQ2 114B, and PQ3 114C ("PQ nodes 114"). PQ nodes 114 may also be referred to as "RLFA network devices." As described with respect to FIG. 1, the illustrated network of FIG. 7 may comprise a private network or a public network, such as the Internet. In addition, source 106 may be included in a remote site.

With respect to the topology illustrated in FIG. 7, the MN 108 receives downstream Join messages and checks for merge eligibility. The joins are merge eligible because, from the MN's point of view, the path to the three PQ nodes go over the same upstream interface. So, the MN performs the merge action. Say, MN 108 elected PQ1 114A and suppressed PQ2 114B and PQ3 114C. Router R2 forwards the merged Join towards Branching Node (BN) 112. When the merged joins reach BN 112, BN 112 realizes that there are suppressed PQs in the opaque data field. BN 112 parses the suppressed PQs and evaluates if the PQs are going over the same upstream interface. In this case, BN 112 realizes that the PQ nodes are going over different upstream interfaces.

Here, the BN has two choices: (1) Use only [PQ1] and send Joins only towards [PQ1]. This works well. But, if [PQ1] were to go down (node/link failure or rate of traffic falls down), the egresses e2 and e3 will suffer even though they had picked PQ2 and PQ3 which are still healthy. This is a minor hit in the coverage for the backup path. (2) To solve the above problem and to retain good coverage, this disclosure describes a functionality called 'Branching' on BN 112. If BN 112 had branching capabilities, BN 112 will go over the opaque data field populated by MN 108 and send Joins towards all the [PQs], including the suppressed PQs. This results in three different FECs. However, BN will forward traffic down towards MN 108 based on only the elected PQ's FEC. The traffic over the suppressed FECs will be discarded. (Forwarding from all FECs towards MN 108 will result in duplicates).

In FIG. 7, BN 112 will send mLDP Joins to all the PQs (PQ1 114A, PQ2 114B, and PQ3 114C) resulting in three different FECs (FEC1, FEC2 and FEC). All PQ nodes will pull traffic and forward down to the BN 112. BN 112 will forward only from the elected FEC, i.e., FEC1 and drop packets coming over FEC 2 and FEC 3 from PQ2 and PQ3.

Most implementations of MoFRR today are capable of forming two trees (one primary and other secondary being dropped). In such cases, when BN 112 receives three FECs, will create two trees (based on say, PQ1 and PQ2) and drop one PQ's FEC (that of PQ3).

LDP Notification message: When the BN 112 realizes that BN 112 is not able to create multiple FECs, probably cause of lack of MoFRR capabilities or due to policy, BN 112 can potentially indicate to the Merge Node using a LDP Notification message. How this works is explained below.

The Merge Node will include the LDP Notification message in its mLDP mapping message indicating that the mLDP Join has multiple PQ nodes listed. When the BN 112 receives the Notification message and realizes that it cannot perform branching, it will signal back to the Merge Node about the branching not being performed. Based on this, the Merge Node will withdraw the merged mLDP Join and send out multiple FECs per PQ node. This LDP Notification messaging is similar to what exists in P2MP make before break (MBB) signaling.

When the BN 112 detects a fault in elected FEC (i.e., from [PQ1]), say due to node/link failure or rate of traffic going down, BN will switch to [PQ2] and forward traffic towards MN 108 thus achieving good coverage.

Branching Node functionality is optional and is needed only for improving coverage.

If the functionality described above of determining whether two nodes fall in the straight line becomes available in IGP in the future, there will be no need for branching as described above. This is because, on MN 108, the paths to PQ 1, PQ 2 and PQ 3 go over the same interface but, they don't fall on the same line, i.e., the path to pq2 does not contain PQ 1. This way, the merge node can decide not to merge and retain the individual FECs.

The Branching Behavior may be summarized as follows: When a node receives an mLDP Join containing multiple PQ suppressed in the opaque data field, the node will do a route lookup on all the PQ nodes. If all the PQs are reachable over the same upstream interface, there is no need for branching and the mLDP Join will be sent only towards the elected PQ.

If the Branching Node BN determines that the suppressed PQs are reachable over different upstream interfaces, then the BN sends out different mLDP Joins, one per PQ, thus forming multiple FECs. However, BN will forward traffic from only one PQ towards the downstream. The traffic coming over the suppressed FECs will be dropped.

When there is a problem with the elected PQ (like node/link failure or rate of traffic going down), the BN will perform MoFRR switchover and forward traffic from one of the suppressed FECs (say FEC2 from [PQ2]).

If the merge node MN conveys by way of a flag in the message to not perform branching, then too, the BN will not perform branching and send the Join only towards elected [PQ1] irrespective of whether the PQs are reachable over different interfaces. Branching functionality is optional and is used only for ensuring complete coverage.

When a Branch node is not capable of MoFRR capabilities, it can indicate this to the Merge Node using a LDP Status TLV message. Based on this Status message the Merge node can withdraw the merged Join and form individual FECs for each of the PQs.

The following illustrates additional example implementations that may be utilized as alternatives or in any combination.

In a network having RLFA for IGP, the backup MoFRR may be set up via the selected PQ node for the LSPRoot. (This helps in lesser fate sharing among primary and backup paths).

MoFRR router may use a different FEC (newly defined in MLDP) to signal the backup path with PQ node in the LSPRoot field and the (primary-LSP root, s, g) as opaque values.

A router capable of merging may match S, G, primary-LSPRoot and the ecmp interface group to decide on whether to merge multiple downstream FECs which differs in PQ node and propagate to its upstream as a single FEC.

The FEC propagated to the upstream may have a list of PQ nodes to which these flows are originally targeted.

A flow that qualifies for merging as above may be merged with a normal mLDP inband FEC and the mLDP-inband FEC alone may be propagated to the upstream.

The decision made by a router to merge may be altered by means of local decision such as configuration (policy).

A branching-capable router may decide to branch a single FEC if the router has multiple PQ nodes and finds that one or more PQ may be reachable via different set of ECMP bundle.

When doing branching as previously stated, the router may operate to ensure that PQ nodes send to different routers are mutually exclusive for different flows.

The decision to branch flows among upstream routers may be made by a capable router may be altered via configuration (policy).

The branching router may do MoFrr-like stream selection so as to ensure data duplication is avoided in the downstream and best possible protection is achieved.

A router may operate to merge the lists of PQ node received from different FEC if it merges them into a single FEC.

A router, when doing merging, may be configured to not include a set of PQ nodes that it is merging in its list. This may be based on local decision.

When processing a MoFRR FEC a router may be configured to remove its own address from list of PQ node address.

When a router gets a MoFRR FEC with lsp-root (PQ node) as its own address, then that router may be configured to propagate to its upstream a mldp-inband FEC without any PQ node address and should slice that upstream FEC with all the downstream MOFRR FECs received for the same (primary-lsp-root, s, g).

FIG. 8 is a block diagram illustrating an example encoding for a FEC element 200 that is included in an mLDP join message (mLDP label mapping message) sent by an egress network device to an ingress network device to establish a primary path to the ingress network device. The FEC element 200 includes a type field 202, an address field 204, an address length field 206, a root node address field 208, an opaque length field 210, and an opaque value field 212. In normal operation, when establishing a primary path to the ingress network device, the egress network device specifies an address of the ingress network device in the root node address field 208, and includes FEC element 200 in an mLDP join message that the egress network device sends to the ingress network device.

Figure 9:
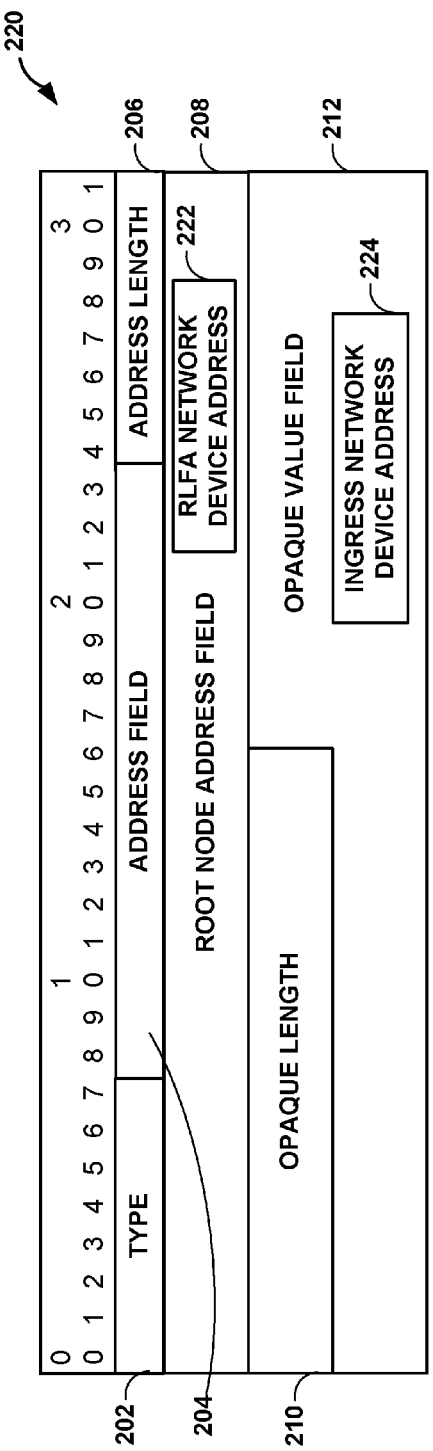
FIG. 9 is a block diagram illustrating an example FEC element encoding for an MLDP join message sent by an egress network device to an RLFA network device to establish an RLFA backup path to the ingress network device.

FIG. 9 is a block diagram illustrating an example FEC element encoding 220 that is included in an MLDP join message sent by an egress network device to an RLFA network device to establish an RLFA backup path to the ingress network device. In accordance with the techniques of this disclosure, when establishing an RLFA backup path to the ingress network device, instead of specifying an address of the ingress network device in the root node address field 208, the egress network device specifies an address of the RLFA network device ("RLFA network device 222") within the root node address field 208. In addition, the egress network device specifies the address of the ingress network device ("ingress network device address 224") within the opaque value field 222. This value in the opaque value field 222 may be referred to as an "LSPRoot Opaque Value." When establishing an RLFA backup path to the RLFA network device, the egress network device includes FEC element 220 in an mLDP join message that the egress network device sends to the RLFA network device. When the RLFA network device receives the mLDP Join message containing FEC element 220, the RLFA network device sees that the RLFA network device is the root and that the opaque value is an LSPRoot Opaque Value. In response to determining that its own address is in the root node address field 208, the RLFA network device parses the Opaque value and extracts the root value, which specifies the address of the ingress network device.

Figure 10:
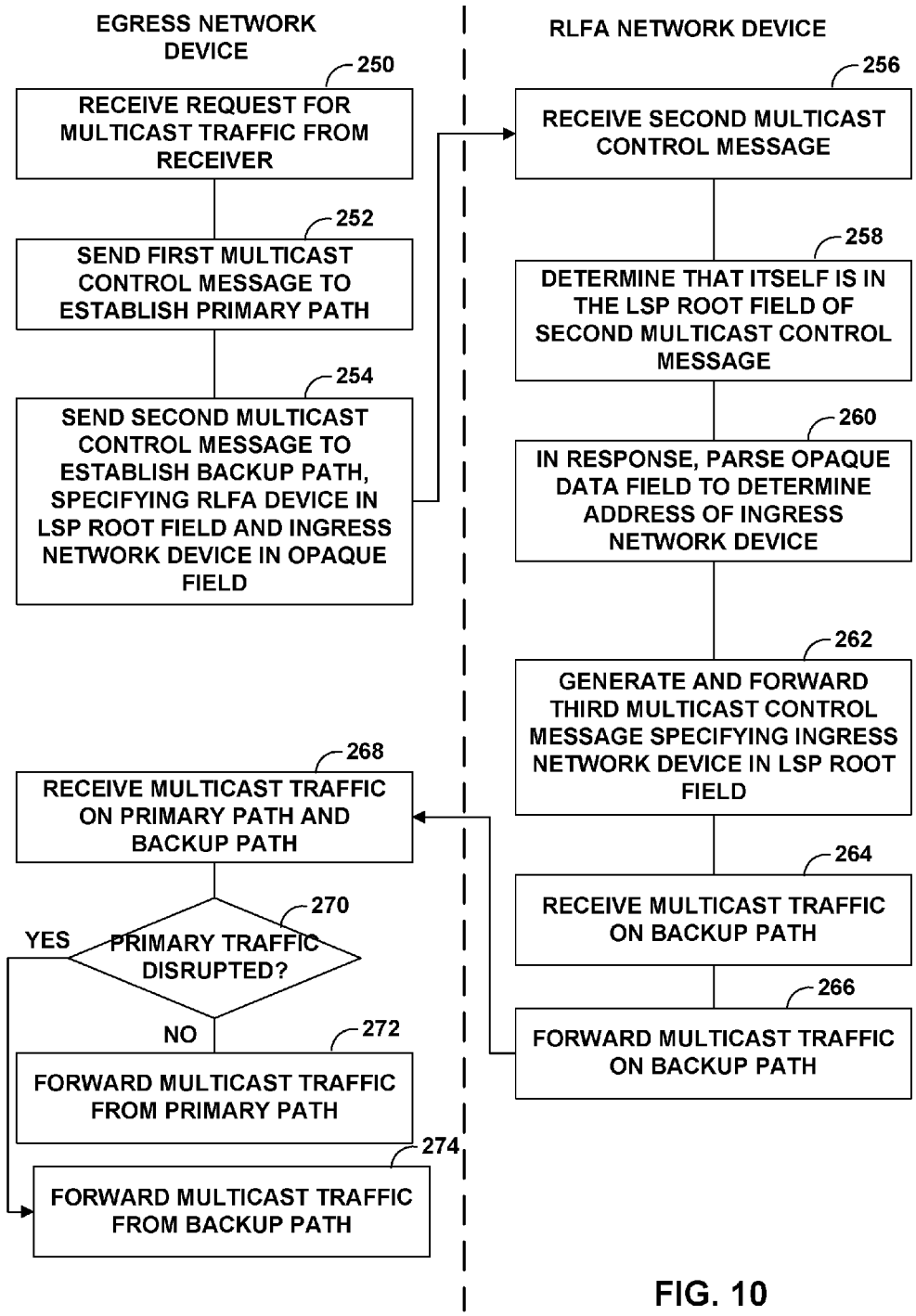
FIG. 10 is a flowchart illustrating example operation of network devices in accordance with techniques of this disclosure.

Any transit routers that receive an MLDP join message including the FEC element 220 would understand the MLDP join message as requesting to build an MP LSP whose root node is the RFLA network device. The transit routers do not interpret the opaque value. FIG. 10 is a flowchart illustrating example operation of network devices in accordance with techniques of this disclosure. For purposes of example, FIG. 10 is described with respect to network devices of FIG. 3).

Egress network device R7 40H receives a request for multicast traffic from one or more receivers, e.g., multicast receiver 38 (250). Egress network device R7 40H sends to an ingress network device of the network 35, a first multicast control message 41A to establish a primary path to the ingress network device R8 401, the first multicast control message including an address of the ingress network device R8 in a field of the first multicast control message that identifies an address of a root node (e.g., an LSP Root field) (252). The first multicast control message may be an mLDP join message (mLDP label mapping message), for example.

Egress network device R7 40H also sends to a remote loop-free alternate (RLFA) network device R4 40E (a PQ node), a second multicast control message 41B to establish an RLFA backup path to the ingress network device, the second multicast control message including an address of the RLFA network device in a field of the second multicast control message that identifies an address of a root node and including the address of the ingress network device in an opaque data field of the second multicast control message (254).

The RLFA network device R4 40E receives a multicast control message propagated from the egress network device, where the first multicast control message includes the address of the RLFA network device in a field of the first multicast control message that identifies an address of a root node (256). In response to an mLDP module 68 (FIG. 4) of the RLFA network device R4 determining that the address of the RLFA network device itself is included in the field of the first multicast control message (258), the mLDP module 68 parses the opaque data field of the first multicast control message to determine an address of an ingress network device included in the opaque data field of the first multicast control message (260).

In response to the mLDP module 68 determining the address of the ingress network device included in the opaque data field, the RLFA network device sends to the ingress network device, a multicast control message 41C to establish the RLFA backup path to the ingress network device, the multicast control message 41C including the determined address of the ingress network device in a field of the multicast control message 41C that identifies an address of a root node (262).

The RLFA network device R4 receives from the ingress network device R8, multicast traffic on the RLFA backup path (264); and forwards the multicast traffic toward the egress network device along the RLFA backup path (266).

The egress network device R7 receives from the ingress network device, multicast traffic on both the primary path and the RLFA backup path (268); and forwards the multicast traffic received from the primary path toward the multicast receiver 38 (272). In response to determining that multicast traffic is not being received via the primary path (270) (e.g., due to a failure along the primary path), the egress network device R7 can still forward the multicast traffic received via the RLFA backup path (274).

In one example, a method includes receiving, by an egress network device configured with multicast only fast re-route (MoFRR), a request for multicast traffic from one or more receivers; sending, by the egress network device to an ingress network device, a first multicast control message including an address of the ingress network device in a LSProot field of the first multicast control message to establish a primary path to the ingress network device; sending, by the egress network device to a remote loop-free alternate (RLFA) network device, a second multicast control message including an address of the RLFA network device in the LSProot field of the second multicast control message and including the address of the ingress network device in an opaque data field of the second multicast control message to establish a RLFA backup path to the ingress network device; receiving, by the egress network device from the ingress network device, multicast traffic on the primary path and the RLFA backup path; and forwarding, by the egress network device, the multicast traffic toward the one or more receivers.

In another example, an egress network device includes a routing engine configured to: receive a request for multicast traffic from one or more receivers, send, to an ingress network device, a first multicast control message including an address of the ingress network device in a LSProot field of the first multicast control message to establish a primary path to the ingress network device, and wherein the egress network device is configured with multicast only fast re-route (MoFRR), send, to a remote loop-free alternate (RLFA) network device, a second multicast control message including an address of the RLFA network device in the LSProot field of the second multicast control message and including the address of the ingress network device in an opaque data field of the second multicast control message to establish a RLFA backup path to the ingress network device. The egress network device also includes a forwarding engine configured to: receive, from the ingress network device, multicast traffic on the primary path and the RLFA backup path, and forward the multicast traffic toward the one or more receivers.

In some examples, a method includes receiving, by a remote loop-free alternate (RLFA) network device from an egress network device, a first multicast control message that includes an address of the RLFA network device in the LSProot field; based on the address of the RLFA being included in the LSProot field of the first multicast control message, parsing, by the RLFA network device, an opaque data field of the first multicast control message to determine an address of an ingress network device included in the opaque data field of the first mLDP control message; sending, by the RLFA network device to the ingress network device, a second multicast control message including the determined address of the ingress network device in a LSProot field of the second multicast control message to establish a RLFA backup path to the ingress network device; receiving, by the RLFA network device from the ingress network device, multicast traffic on the RLFA backup path; and forwarding, by the RLFA network device, the multicast traffic toward the egress network device along the RLFA backup path.

In some examples, a remote loop-free alternate (RLFA) network device includes: a routing engine configured to: receive, from an egress network device, a first multicast control message that includes an address of the RLFA network device in the LSProot field, based on the address of the RLFA being included in the LSProot field of the first multicast control message, parse an opaque data field of the first multicast control message to determine an address of an ingress network device included in the opaque data field of the first mLDP control message, and send, to the ingress network device, a second multicast control message including the determined address of the ingress network device in a LSProot field of the second multicast control message to establish a RLFA backup path to the ingress network device. The RLFA network device also includes a forwarding engine configured to: receive, from the ingress network device, multicast traffic on the RLFA backup path, and forward the multicast traffic toward the egress network device along the RLFA backup path.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described in this disclosure. These and other examples are within the scope of the following claims.

What is claimed is:

1. A method comprising:
receiving, by an egress network device of a network, a request for multicast traffic from one or more receivers;
sending, by the egress network device to an ingress network device of the network, a first multicast control message to establish a primary label switched path (LSP) to the ingress network device, the first multicast control message including an address of the ingress network device in a field of the first multicast control message that identifies an address of a root node;
sending, by the egress network device to a remote loop-free alternate (RLFA) network device, a second multicast control message to establish an RLFA backup LSP to the ingress network device, the second multicast control message including an address of the RLFA network device in a field of the second multicast control message that identifies an address of a root node and including the address of the ingress network device in an opaque data field of the second multicast control message, wherein the inclusion of the address of the RLFA network device in the field of the second multicast control message causes the RLFA network device to parse the opaque data field of the second multicast control message to determine the address of the ingress network device;
receiving, by the egress network device from the ingress network device, multicast traffic on the primary LSP and the RLFA backup LSP; and
forwarding, by the egress network device, the multicast traffic toward the one or more receivers.

2. The method of claim 1,
wherein the first multicast control message comprises a first multicast Label Distribution Protocol (mLDP) join message, and wherein the field of the first multicast control message that includes the address of the ingress network device comprises an LSP Root field of a forwarding equivalence class (FEC) element included in the first mLDP join message, and
wherein the second multicast control message comprises a second mLDP join message, wherein the field of the second multicast control message that includes the address of the RLFA network device comprises an LSPRoot field of a FEC element included in the second mLDP join message, and wherein the opaque data field of the second multicast control message that includes the address of the ingress network device comprises a LSPRoot Opaque Value field of the FEC element included in the second mLDP join message.

3. The method of claim 1,
wherein the primary LSP comprises one of a point to multipoint label switched path (LSP) and a multipoint to multipoint LSP, and wherein the RLFA backup LSP comprises one of a point to multipoint label switched path (LSP) and a multipoint to multipoint LSP.

4. The method of claim 1, wherein receiving the multicast traffic comprises receiving the multicast traffic from a multicast source, wherein the multicast source and the one or more receivers reside in a Protocol Independent Multicast (PIM) domain in which multicast control messages are sent using a PIM protocol, and wherein the ingress network device, the egress network device, and the RLFA network device reside in an LDP domain in which multicast control messages are sent using a label distribution protocol.

5. The method of claim 1,
wherein the RLFA network device comprises a PQ node of the egress network device,
wherein a PQ node comprises a network device that is a member of both an extended P-space and a Q-space,
wherein the Q-space comprises a set of network devices from which the egress network device can be reached without any path, including equal cost path splits, transiting a protected link, and
wherein the extended P-space comprises a union of a P-space of the neighbors of the ingress network device network device with respect to the protected link, wherein the P-space is a set of network devices reachable from the ingress network device without any path, including equal cost path splits, transiting the protected link.

6. An egress network device comprising:
a routing engine configured to:
receive a request for multicast traffic from one or more receivers,
send, to an ingress network device, a first multicast control message to establish a primary label switched path (LSP) to the ingress network device, the first multicast control message including an address of the ingress network device in a field of the first multicast control message that identifies an address of a root node, and
send, to a remote loop-free alternate (RLFA) network device, a second multicast control message to establish an RLFA backup LSP to the ingress network device, the second multicast control message including an address of the RLFA network device in a field of the second multicast control message that identifies an address of a root node and including the address of the ingress network device in an opaque data field of the second multicast control message, wherein the inclusion of the address of the RLFA network device in the field of the second multicast control message causes the RLFA network device to parse the opaque data field of the second multicast control message to determine the address of the ingress network device; and
a forwarding engine configured to:
receive, from the ingress network device, multicast traffic on the primary LSP and the RLFA backup LSP, and
forward, by the egress network device, the multicast traffic toward the one or more receivers.

7. The egress network device of claim 6,
wherein the first multicast control message comprises a first multicast Label Distribution Protocol (mLDP) join message, and wherein the field of the first multicast control message that includes the address of the ingress network device comprises an LSPRoot field of a forwarding equivalence class (FEC) element included in the first mLDP join message, and wherein the second multicast control message comprises a second mLDP join message, wherein the field of the second multicast control message that includes the address of the RLFA network device comprises an LSPRoot field of a FEC element included in the second mLDP join message, and wherein the opaque data field of the second multicast control message that includes the address of the ingress network device comprises a LSPRoot Opaque Value field of the FEC element included in the second mLDP join message.

8. The egress network device of claim 6, wherein the egress network device is configured with multicast only fast re-route (MoFRR).

9. A method comprising:
receiving, by a remote loop-free alternate (RLFA) network device from an egress network device, a first multicast control message that includes an address of the RLFA network device in a field of the first multicast control message that identifies an address of a root node;
in response to determining that the address of the RLFA network device is included in the field of the first multicast control message, parsing, by the RLFA network device, an opaque data field of the first multicast control message to determine an address of an ingress network device included in the opaque data field of the first multicast control message;
in response to determining the address of the ingress network device included in the opaque data field, sending, by the RLFA network device to the ingress network device, a second multicast control message to establish an RLFA backup label switched path (LSP) to the ingress network device, the second multicast control message including the determined address of the ingress network device in a field of the second multicast control message that identifies an address of a root node;
receiving, by the RLFA network device from the ingress network device, multicast traffic on the RLFA backup LSP; and
forwarding, by the RLFA network device, the multicast traffic toward the egress network device along the RLFA backup LSP.

10. The method of claim 9,
wherein the first multicast control message comprises a first multicast Label Distribution Protocol (mLDP) join message, and wherein the field of the first multicast control message that includes the address of the RLFA network device comprises an LSPRoot field of a forwarding equivalence class (FEC) element included in the first mLDP join message, and wherein the opaque data field of the first multicast control message that includes the address of the ingress network device comprises a LSPRoot Opaque Value field of the FEC element included in the first mLDP join message, and
wherein the second multicast control message comprises a second mLDP join message, wherein the field of the second multicast control message that includes the address of the ingress network device comprises an LSPRoot field of a FEC element included in the second mLDP join message.

11. The method of claim 9, wherein the RLFA backup LSP comprises one of a point to multipoint label switched path (LSP) and a multipoint to multipoint LSP.

12. The method of claim 9, further comprising:
in response to determining the address of the ingress network device included in the opaque data field, installing, by the RLFA network device, forwarding information specifying a label for forwarding multicast traffic received from the ingress network device.

13. A remote loop-free alternate (RLFA) network device comprising:
a routing engine configured to:
receive, from an egress network device, a first multicast control message that includes an address of the RLFA network device in a field of the first multicast control message that identifies an address of a root node,
in response to determining that the address of the RLFA network device is included in the field of the first multicast control message, parse an opaque data field of the first multicast control message to determine an address of an ingress network device included in the opaque data field of the first multicast control message, and
in response to determining the address of the ingress network device included in the opaque data field, send to the ingress network device, a second multicast control message to establish an RLFA backup label switched path (LSP) to the ingress network device, the second multicast control message including the determined address of the ingress network device in a field of the second multicast control message that identifies an address of a root node; and
a forwarding engine configured to:
receive, from the ingress network device, multicast traffic on the RLFA backup LSP, and
forward the multicast traffic toward the egress network device along the RLFA backup LSP.

14. The RLFA network device of claim 13,
wherein the first multicast control message comprises a first multicast Label Distribution Protocol (mLDP) join message, and wherein the field of the first multicast control message that includes the address of the RLFA network device comprises an LSPRoot field of a forwarding equivalence class (FEC) element included in the first mLDP join message, and wherein the opaque data field of the first multicast control message that includes the address of the ingress network device comprises a LSP Root Opaque Value field of the FEC element included in the first mLDP join message, and
wherein the second multicast control message comprises a second mLDP join message, wherein the field of the second multicast control message that includes the address of the ingress network device comprises an LSPRoot field of a FEC element included in the second mLDP join message.

15. The RLFA network device of claim 13, wherein the RLFA network device is configured to:
in response to determining the address of the ingress network device included in the opaque data field, install forwarding information specifying a label for forwarding multicast traffic received from the ingress network device.

16. A system comprising:
one or more receivers;
an ingress network device of a routing domain;
a remote loop-free alternate (RLFA) network device;
an egress network device of the routing domain, the egress network device comprising:

a routing engine configured to:
receive a request for multicast traffic from the one or more receivers,
send, to the ingress network device, a first multicast control message to establish a primary label switched path (LSP) to the ingress network device, the first multicast control message including an address of the ingress network device in a field of the first multicast control message that identifies an address of a root node, and
send, to the RLFA network device, a second multicast control message to establish an RLFA backup LSP to the ingress network device, the second multicast control message including an address of the RLFA network device in a field of the second multicast control message that identifies an address of a root node and including the address of the ingress network device in an opaque data field of the second multicast control message; and
wherein the RLFA network device is positioned along the RLFA backup LSP to the ingress device, the RLFA network device comprising:
a routing engine configured to:
receive, from the egress network device, the second multicast control message,
in response to determining that the address of the RLFA network device is included in the field of the second multicast control message, parse the opaque data field of the second multicast control message to determine the address of the ingress network device included in the opaque data field of the second multicast control message, and
in response to determining the address of the ingress network device included in the opaque data field, send to the ingress network device, a third multicast control message to establish the RLFA backup LSP to the ingress network device, the third multicast control message including the determined address of the ingress network device in a field of the third multicast control message that identifies an address of a root node.

17. The system of claim 16,
wherein the RLFA network device is configured to:
receive, from the ingress network device, the multicast traffic on the RLFA backup LSP, and
forward the multicast traffic toward the egress network device along the RLFA backup LSP, and
wherein the egress network device is configured to:
receive, from the ingress network device, multicast traffic on the primary path and the RLFA backup LSP, and
forward the multicast traffic toward the one or more receivers.

18. The system of claim 16, further comprising:
a merge node on a path between the egress network device and the RLFA network device, wherein the merge node is configured to, in response to receiving multiple multicast join messages for the same multicast flow, determining whether the multiple multicast join messages should be merged such that the merge node sends only a single multicast join message toward the RLFA network device,
wherein the merge node is configured to, in response to determining that the multiple multicast join messages each specify the same upstream interface of the merge node, merge the multiple multicast join messages to output only a single multicast join message toward the RLFA network device.

19. The system of claim 18, wherein the merge node is configured to select the RLFA network device from among a plurality of potential RLFA network devices to which to select as the Forwarding Equivalence Class (FEC) to be used in the single multicast join message output toward the RLFA network device.

20. The system of claim 19, wherein the merge node is configured to include, in the opaque data field of the single multicast join message, addresses of the other non-selected RLFA network devices of the plurality of potential RLFA network device.

21. The system of claim 20, further comprising:
a branching node on the path between the egress network device and the RLFA network device, wherein the branching node is configured to:
in response to receiving the single multicast join message that includes the addresses of the other non-selected RLFA network devices in the opaque data field, perform a route lookup on each of the RLFA network devices to determine whether all of the RLFA network devices are reachable over the same upstream interface of the branching node,
if all of the RLFA network devices are reachable over the same upstream interface of the branching node send the single multicast join message only towards the selected RLFA network device, and
if not all of the RLFA network devices are reachable over the same upstream interface of the branching node, sending different multicast join messages towards each of the plurality of RLFA network devices, wherein each of the different multicast join messages specifies a different FEC.

* * * * *